3,018,196
TREATMENT OF CELLULOSIC MATERIALS TO RESIST FUNGICIDAL ATTACK

George M. Wagner, Lewiston, N.Y., assignor to Olin Mathieson Chemical Corporation, a corporation of Virginia
No Drawing. Filed Dec. 4, 1959, Ser. No. 857,277
3 Claims. (Cl. 117—143)

This invention relates to the prevention of fungicidal growth upon cellulosic materials.

Practically all cellulosic materials are susceptible to attack by fungi. Textiles, wood and paper are especially susceptible if slightly damp. The dry rot common in boats and dock pilings is caused by the growth of various fungi which thrive in the continual dampness. Paper and cloth, for example, clothes and tents, are ready hosts to fungal growth in hot, humid environments. The effect of the fungus on these materials is to weaken them until they finally disintegrate.

Combined copper is an efficient fungicide. It is toxic to fungi in very small amounts and thus is applied to susceptible materials in various forms. Water solutions of copper salts are sometimes used to impregnate various materials. However, these soluble salts tend to leach out if appreciable quantities of water are encountered. Soluble copper salts are not practical in outdoor applications accessible to rain or large bodies of water as in boat hulls and dock pilings.

The process of the present invention comprises applying to a cellulosic material a substantially water-insoluble reaction product of a cupric salt with a hydrazide of dibasic acid having one of the following formulas:

$(CONHNH_2)_2$, $R(CONHNH_2)_2$, $R'(CONHNH_2)_2$, or $R''(CONHNH_2)_2$ wherein R is an alkylene chain of up to 6 carbon atoms, R' is an alkylene chain of up to 6 carbon atoms interrupted by an oxygen atom in the form of an ether linkage and R'' is an alkylene chain of up to 6 carbon atoms interrupted by a sulfur atom in the form of a thioether linkage. Hydrazides of suitable acids include those of oxalic, diglycolic, thiodiglycolic, adipic, pimelic, suberic and $O(CH_2CH_2CH_2COOH)_2$. These hydrazides are generally water soluble. Any water-soluble source of cupric ions can be used including, for example, cupric nitrate, sulfate, chloride, acetate and other water-soluble cupric salts. Mixing an aqueous solution of the hydrazide with an aqueous solution of cupric ions results in the immediate precipitation of a bluish-green product which settles rapidly. The molecular proportion of cupric ion to hydrazide is not critical, because any excess of one or the other will remain in solution after the product precipitates. From about 1 mole to 3 moles of cupric ion per mole of hydrazide is preferable. This ratio is close to the stoichiometric ratio of 2 moles of cupric ion per mole of hydrazide. The dried precipitate can be mixed with a diluent powder or suspended in a liquid, for example, water or kerosene, and applied by dusting or spraying the material to be treated. The preferred method for applying the composition is to soak the material to be treated in an aqueous hydrazide solution until permeated and then soak the material in an aqueous copper solution. The copper solution can be applied first if desired. By applying the solutions one at a time the precipitate is formed within the fibers of the material. Thus the treatment is permanent. It cannot be flaked off or dusted away by physical abrasion. Only about 0.1% by weight of the copper-hydrazide composition based on the weight of the material treated is sufficient to prevent the growth of most fungi. More can be used if desired but it is not necessary to used more than about 5% by weight in any case since complete inhibition will generally be obtained well below this amount. For the application of these proportions, solutions of hydrazide and cupric salt of about 0.1% to 5% are suitable.

The following examples further illustrate this invention:

Example I

One of three pieces of an eight ounce cotton duck was treated to apply a composition of this invention by first passing the cloth through a one percent by weight aqueous solution of the hydrazide of diglycolic acid, $$O(CH_2CONHNH_2)_2$$

It was wrung to contain 85% by weight, based on its own weight, of the liquid. It was then passed through a 1.5% by weight solution of cupric sulfate, rinsed in water and dried. A second piece of the same cloth was impregnated with 1% by weight of 2,2'-methylene bis (4-chlorophenol). This is a commerically acceptable fungicide tested here for comparison. A third piece of the cloth was untreated and served as the blank. These 3 pieces of cloth were each cut in half and one half of each was buried for 2 weeks in a soil having a high leaf mold content, at room temperature. The other half of each of the 3 pieces was leached in running water for 15 hours and they, too, were buried in this same soil for 2 weeks. The table below shows the loss in tensile strength by each of the cloths:

| Fungicide | percent tensile strength [1] loss after 2 week burial | |
|---|---|---|
| | before leaching | after leaching |
| Copper diglycolic hydrazide | 5 | 5 |
| 2,2'-Methylene bis (4-chlorophenol) | 16 | 74 |
| None | 80 | 80 |

[1] Measured by means of a Scott tensile tester.

The copper hydrazide composition provided excellent protection and was unaffected by the water rinse. While the 2,2'-methylene bis (4-chlorophenol) provided considerable protection initially, it did not withstand the water rinse and offered only a slight protection thereafter, as seen by comparison with the blank.

Example II

Two pieces of cotton duck fabric were dipped in a 1% by weight diglycolic acid solution, wrung under different pressures so that they contained a different amount of the hydrazide and then dipped into a 2% by weight cupric sulfate solution. After rinsing and drying, one cloth contained 0.7% by weight of the coppyer hydrazide composition and the other contained 1.4% by weight of the composition. A third piece of the cloth was impregnated with 1% by weight of 2,2'-methylene bis (4-chlorophenol). A fourth piece was untreated and served as a blank. These 4 pieces of duck fabric were leached in running water for 72 hours and then were buried in fungus-infected soil, at room temperature, for 2 weeks. The percent of the tensile strength lost by these cloths is reported in the table below:

| Fungicide | percent on cloth | percent tensile strength loss |
|---|---|---|
| Copper diglycolic hydrazide | 0.7 | 3 |
| Do | 1.4 | 3 |
| 2,2'-Methylene bis(4-chlorophenol) | 1.0 | 30 |
| None | 0 | 63 |

Example III

An aqueous solution was made up containing 8 grams per liter of the hydrazide of diglycolic acid. To one liter of this solution there was added 100 grams of water containing 27 grams of the trihydrate of cupric nitrate. This represented 2 moles of copper per mole of hydrazide. The precipitate was filtered from the solution and air dried. It was suitable for use as a fungicide by mixing it with an equal weight of talc and dusting it on various substances.

Example IV

In order to prevent dry rot, several pieces of white pine to be used as fenceposts were held submerged for 3 hours in a 5% by weight aqueous solution of cupric chloride. They were then held submerged for 3 hours in a 5% by weight aqueous solution of the hydrazide of adipic acid, $(CH_2)_4(CONHNH_2)_2$. The posts were rinsed in water and air-dried before use.

Example V

Linen and rayon (regenerated cellulose) were protected from fungus attack by passing them through a 1% by weight solution of the hydrazide of diglycolic acid followed by a thorough soaking with a 2% aqueous solution of cupric acetate and drying.

Example VI

A solution was made up containing 10 grams per liter of the hydrazide of suberic acid, $(CH_2)_6(CONHNH_2)_2$. It was padded onto rayon to the extent that the cloth picked up an amount of the solution equal to its own weight. After this the cloth was passed through a 5% by weight aqueous solution of cupric sulfate, rinsed in water and air dried to produce a fungus-resistant material.

I claim:

1. The method of treating cellulosic materials to resist the growth of fungi thereon which comprises applying to the cellulosic materials about 0.1% to 5% by weight of the reaction product of a water-soluble cupric salt and a water-soluble hydrazide of an organic acid selected from the group consisting of $$(CONHNH_2)_2, R(CONHNH_2)_2,$$
$$R'(CONHNH_2)_2, \text{ and } R''(CONHNH_2)_2$$

wherein R is an alkylene chain of not over 6 carbon atoms, R' is an alkylene chain of not over 6 carbon atoms which is interrupted by an oxygen atom in the form of an ether linkage and R'' is an alkylene chain of not over 6 carbon atoms which is interrupted by a sulfur atom in the form of a thioether linkage.

2. The method of claim 1 in which the cellulosic material is first impregnated with an aqueous solution of the said hydrazide and then impregnated with an aqueous solution of a cupric salt.

3. The method of claim 1 in which the cellulosic material is first impregnated with an aqueous solution of a cupric salt and then impregnated with an aqueous solution of the said hydrazide.

References Cited in the file of this patent

UNITED STATES PATENTS

| | | |
|---|---|---|
| 2,381,852 | Hochwalt | Aug. 7, 1945 |
| 2,845,446 | Soule | July 29, 1958 |